W. ELSNER.
VESSEL FOR DISPENSING LIQUIDS.
APPLICATION FILED MAY 12, 1914.
1,227,125.
Patented May 22, 1917.
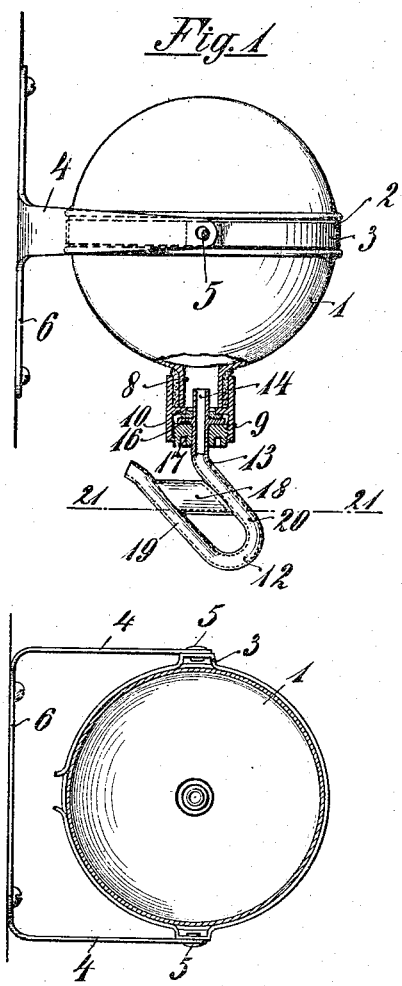
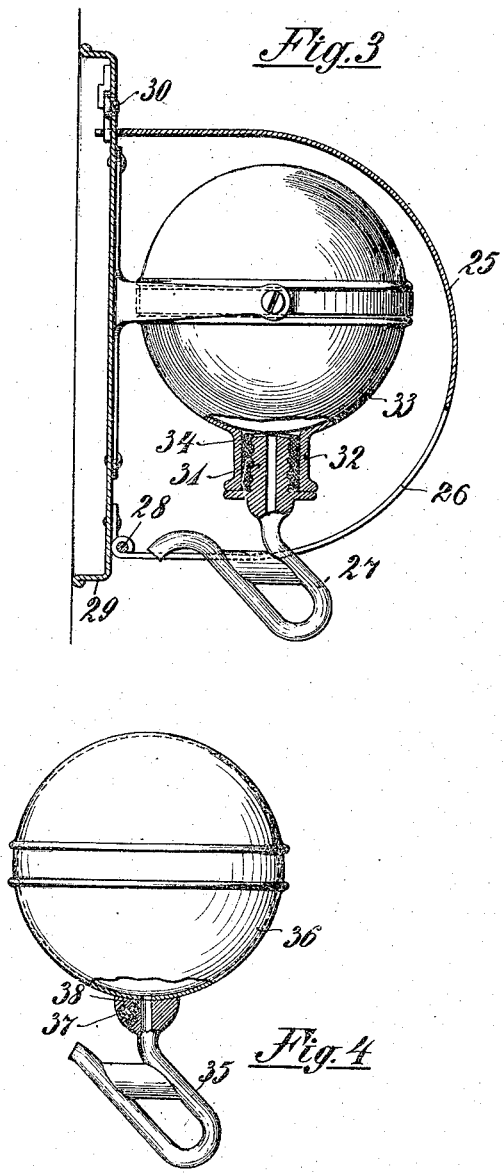
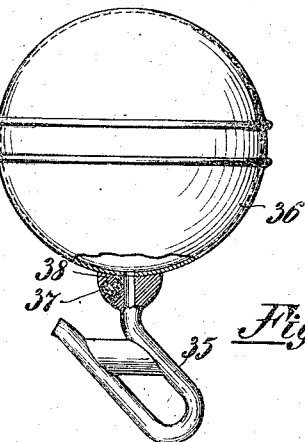

UNITED STATES PATENT OFFICE.

WILHELM ELSNER, OF ZURICH, SWITZERLAND.

VESSEL FOR DISPENSING LIQUIDS.

1,227,125.  Specification of Letters Patent.  Patented May 22, 1917.

Application filed May 12, 1914. Serial No. 838,080.

*To all whom it may concern:*

Be it known that I, WILHELM ELSNER, a citizen of the Swiss Confederation, residing at Bolleystrasse No. 1, Zurich, Switzerland, have invented new and useful Improvements in Vessels for Dispensing Liquids, of which the following is a specification.

The invention relates to a vessel for dispensing liquids for instance liquid soap and has for its object to provide a very simple and effective device for insuring the delivery of a predetermined quantity of liquid from the vessel the device being so arranged that the entire contents of the vessel may be delivered. A further object of the invention is to deliver the liquid soap or other liquid substance into the hands for cleaning purposes in an easy manner without the necessity of handling the vessel in such a way as would soil the hands.

Several practical embodiments of the invention are represented in the accompanying drawings, in which:

Figure 1 is a side view of the vessel with the socket in section.

Fig. 2 is a sectional plan view.

Fig. 3 shows another form of construction in a side view, parts being shown in section.

Fig. 4 is a side view of a third form of construction, parts being shown in section.

The vessel 1 is an air-tight receptacle provided with a valveless vertical outlet tube 8 projecting from the bottom when the vessel is pivotally supported in a ring 3 located in a circular groove 2 of the vessel and rotatably mounted in a bracket 4 by means of pins 5. The bracket 4 is provided with a base 6 fitted to be secured to the wall or other support.

The outlet tube 8 or socket is surrounded by a metal ring 9 which is rigidly fixed thereto by means of a suitable cement or the like. The inner wall of the ring 9 is screw-threaded and is provided with an inwardly projecting flange 10. To the ring 9 I attach a U-shaped tube 12 which is open at both ends and which has one shank bent out of the vertical plane at 13. This construction permits the delivery of a predetermined quantity of liquid from the vessel, allowing an interruption of the flow of the liquid at a predetermined moment as soon as the vessel is returned in the position Fig. 1. The bent portion 14 of said tube 12 is provided with a collar 16 which may be pressed against the flange 10 by means of a nut 17 screwed into the ring 9. Between the flange 10 and the collar 16 a washer of elastic material is arranged securing the hermetical closure of the vessel 1. Between the shanks of the U-shaped tube 12, I arrange a hollow cross piece 18 which communicates with the shank 19 but which is closed against the shank 20. The shanks 19 and 20 are in a plane perpendicular to the axis of suspension passing through the pins 5. When the vessel is tilted in one direction, the liquid in the shank 19 will be discharged and sufficient air will be admitted to the vessel to cause the liquid to rise to the required level in the shank 19 when the vessel returns to its normal position shown in Fig. 1. The device operates as follows: When the vessel 1 which has been previously filled with liquid is at rest, the liquid in the shank 19 assumes the level shown by the line 21—21. If the vessel 1 is tilted as above described, the contents of shank 19 flow out of the tube 12. If the vessel returns to its normal position the liquid again takes the level 21—21. If by the change of temperature the air inside the vessel 1 expands the liquid in the shank 19 rises and enters the hollow cross-piece 18 which is emptied again as soon as the vessel 1 is tilted. The vessel returns automatically to its normal position.

The device shown in Fig. 3 is provided with a protective casing 25 which is provided with a slot 26 through which the tube 27 projects. The casing 25 is hinged at 28 to a back-plate 29 which may be fixed to the wall in any suitable manner. A suitable lock 30 is provided on said back-plate to secure the casing 25 in its closed position. One end of the tube 27 is screw-threaded and between the screw-threaded part 31 and the inner wall of the socket 32 of the glass vessel 33 I arrange a piece of india-rubber.

The vessel may be constructed as shown in Fig. 4. The delivering tube 35 is made in one with the vessel 36 thus obviating the joint. I provide a boring 38 which is closed by a screw 37 through which boring the vessel 36 may be filled with liquid.

The vessel and the delivery tubes may be made of any suitable material and the connection between the tube and vessel may be made in any suitable manner.

It is evident that the shape of the vessel, the mode of suspension, etc., may be varied and that other changes might be made in the construction, form and arrangement of the several parts without departing from the spirit and scope of my invention. Hence I do not wish to limit myself strictly to the construction herein set forth; but

What I claim as my invention is:

A device of the character described, comprising in combination, an air-tight vessel having a circular groove, a valveless vertical outlet tube projecting from said vessel, and a ring in said groove in which the vessel is pivotally supported, a bracket and pins with which said ring is pivotally mounted in said bracket, shanks on said outlet tube in a plane perpendicular to the axis of suspension passing through said pins, and a hollow cross-piece communicating with one of said shanks but closed against the other, substantially as described and for the purpose set forth.

In testimony whereof I affix my signature in presence of two witnesses.

WILHELM ELSNER.

Witnesses:
CARL GUBLER,
AUGUST RÜEGG.